(12) United States Patent
Janz

(10) Patent No.: US 6,178,055 B1
(45) Date of Patent: Jan. 23, 2001

(54) LOW RIPPLE NEGATIVE VOLTAGE SUPPLY FOR A DISC DRIVE

(75) Inventor: Donald W. Janz, Oklahoma City, OK (US)

(73) Assignee: Seagate Technology LLC, Scotts Valley, CA (US)

(*) Notice: Under 35 U.S.C. 154(b), the term of this patent shall be extended for 0 days.

(21) Appl. No.: 09/105,554

(22) Filed: Jun. 26, 1998

Related U.S. Application Data
(60) Provisional application No. 60/075,382, filed on Feb. 20, 1998.

(51) Int. Cl.[7] ................................ G11B 5/09; G11B 5/02; H03B 1/00; G05F 1/10
(52) U.S. Cl. .......................... 360/46; 360/67; 327/108; 327/538
(58) Field of Search ................. 360/46, 66, 67; 327/108, 538

(56) References Cited

FOREIGN PATENT DOCUMENTS

| | | |
|---|---|---|
| 0257810A2 | 3/1988 | (EP) . |
| 0489412A2 | 6/1992 | (EP) . |
| WO 95/17036 | 6/1995 | (WO) . |

Primary Examiner—W. Chris Kim
(74) Attorney, Agent, or Firm—Crowe & Dunlevy

(57) ABSTRACT

An apparatus and method are disclosed for generating a low ripple negative voltage suitable for use in a disc drive. A negative voltage supply comprises a pulse generator circuit which generates first and second driver signals in relation to a load of the negative voltage supply. The first driver signal comprises a series of periodically occurring first pulses and the second driver signal comprises a series of periodically occurring second pulses. The first and second pulses are mutually exclusive in time so that at least a minimum delay of selected, nonzero length is provided between transitions of subsequently occurring first and second pulses. The negative voltage supply further comprises a regulator circuit, operably coupled to the pulse generator circuit, which generates the negative voltage in response to the first and second driver signals utilizing a pair of storage capacitors which alternately accumulate and transfer charge to an output capacitor in response to the first and second driver signals.

16 Claims, 6 Drawing Sheets

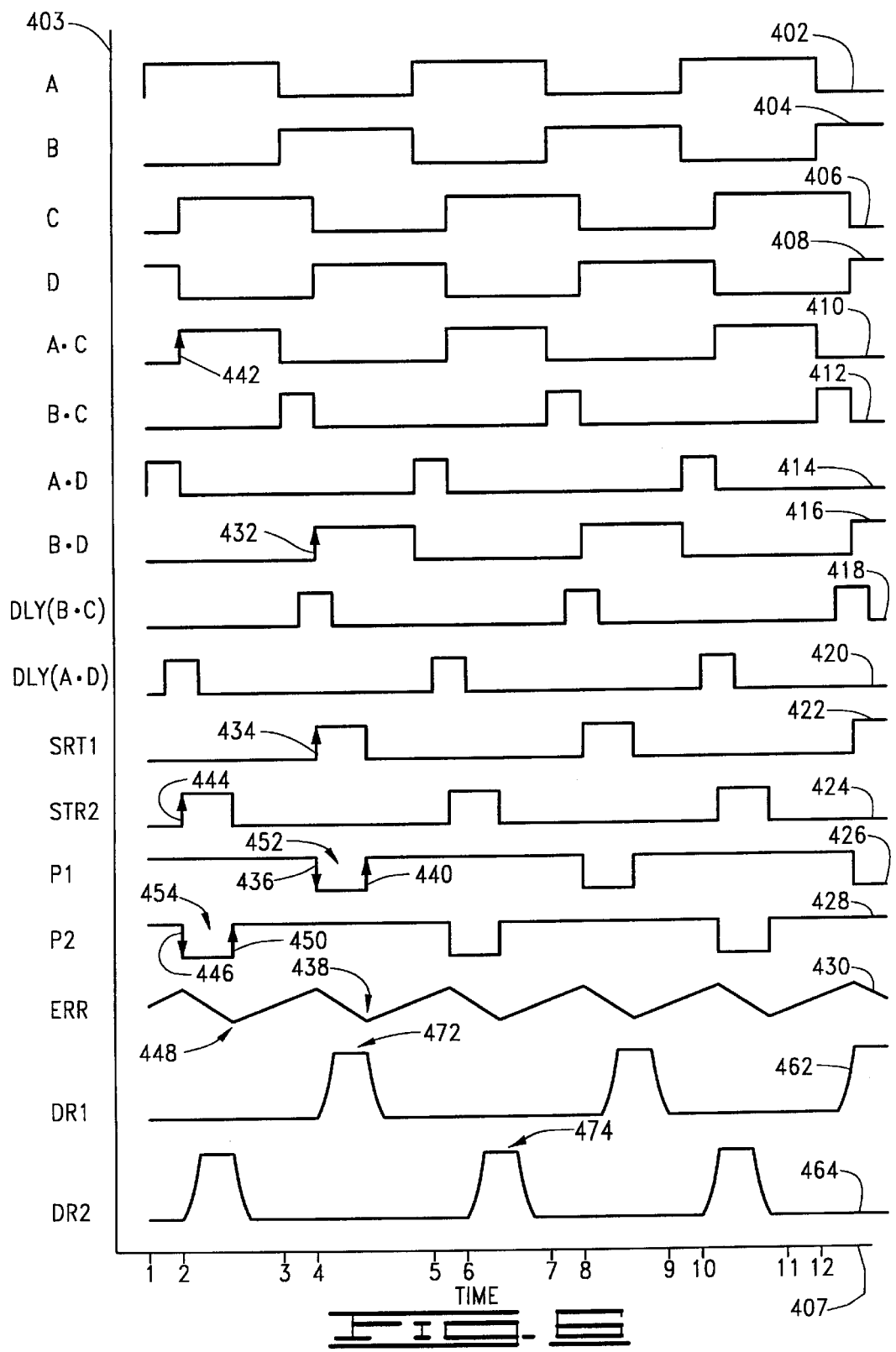

LOW RIPPLE NEGATIVE VOLTAGE SUPPLY FOR A DISC DRIVE

RELATED APPLICATIONS

This application claims priority to Provisional Application Ser. No. 60/075,382 entitled NEGATIVE SWITCHING REGULATOR WITH EXTERNAL COMPONENTS, filed Feb. 20, 1998.

FIELD OF THE INVENTION

This invention relates generally to the field of disc drive storage devices, and more particularly, but not by way of limitation, to a high performance negative voltage regulator suitable for use in a disc drive.

BACKGROUND OF THE INVENTION

To operate properly, electrical circuitry often requires a supply of voltage at a negative potential with respect to ground (i.e., a negative voltage). Such is typically the case for a disc drive, which is a digital data storage device which enables a user of a computer system to store and retrieve large amounts of data in a fast and efficient manner.

A typical desktop computer disc drive requires a variety of operational voltage input levels, including negative five volts (−5V) and positive five and twelve volts (+5 and +12V). These voltages can be supplied externally by a computer power supply, or generated internally by appropriate circuitry of the disc drive. For example, some disc drives incorporate an inverting power supply to generate the requisite −5V from an externally supplied +5V input.

In a typical drive, data are magnetically stored using a plurality of read/write heads which controllably access recording surfaces of a plurality of corresponding, rotatable discs. The heads are moved relative to the discs by an actuator assembly and a closed-loop, servo control system. A preamplifier/driver circuit, typically mounted directly to the actuator assembly, facilitates the writing and reading of data by providing write currents to the heads during a write operation and read bias currents to the heads during a read operation.

A typical preamplifier/driver circuit utilizes a negative voltage (such as −5V) in the generation of both read bias and write currents. It is desirable that the negative voltage be provided at a nominally constant level, as noise and voltage fluctuations present in the negative voltage can adversely affect both the writing and reading of data.

A variety of negative voltage supplies have been disclosed in the prior art, including European Patent Application No. 91 120 787.6 (published Jun. 10, 1992 as Publication No. 0 489 412 A2) and International Patent Application No. PCT/US93/12178 (published under the Patent Cooperation Treaty on Jun. 22, 1995 as Publication No. WO 95/17036). These and other similarly constructed prior art negative voltage power supplies typically utilize a capacitor which alternatively stores a charge from a positive voltage source and then transfers the charge to generate the negative voltage across the load.

Although operative for some applications, the increasingly stringent requirements particular to disc drive applications such as faster current responses and significantly lower levels of ripple distortion over a variety of current loads limits the feasibility of such prior art sources. There is a need, therefore, for an improved negative voltage supply capable of outputting a low ripple, fast-response, constant negative voltage over a wide range of loads.

SUMMARY OF THE INVENTION

The present invention provides an apparatus and method for generating a low ripple negative voltage suitable for use in data transfer operations of a high performance disc drive.

As exemplified by a preferred embodiment, a negative voltage supply is provided which includes a pulse generator circuit which generates first and second analog driver signals (herein referred to as DR1, DR2) in relation to a load of the negative voltage supply. The first driver signal DR1 comprises a series of periodically occurring first pulses and the second driver signal DR2 comprises a series of periodically occurring second pulses. The first and second pulses are mutually exclusive in time so that at least a minimum delay of selected, nonzero length (herein referred to as $t_D$) is provided between transitions of subsequently occurring first and second pulses.

The negative voltage supply further includes a regulator circuit, operably coupled to the pulse generator circuit, which generates the negative voltage in response to the first and second driver signals utilizing a pair of storage capacitors which alternately accumulate and transfer charge to an output capacitor.

These and various other features as well as advantages which characterize the present invention will be apparent from a reading of the following detailed description and a review of the associated drawings.

BRIEF DESCRIPTION OF THE DRAWINGS

FIG. 6 provides graphical representations of a number of signals generated by the pulse generator circuit of FIGS. 3 and 4 under a moderate load condition.

FIG. 7 provides additional graphical representations of signals generated by the pulse generator circuit of FIGS. 3 and 4 under a substantially maximum load condition.

DETAILED DESCRIPTION

Figure 1:
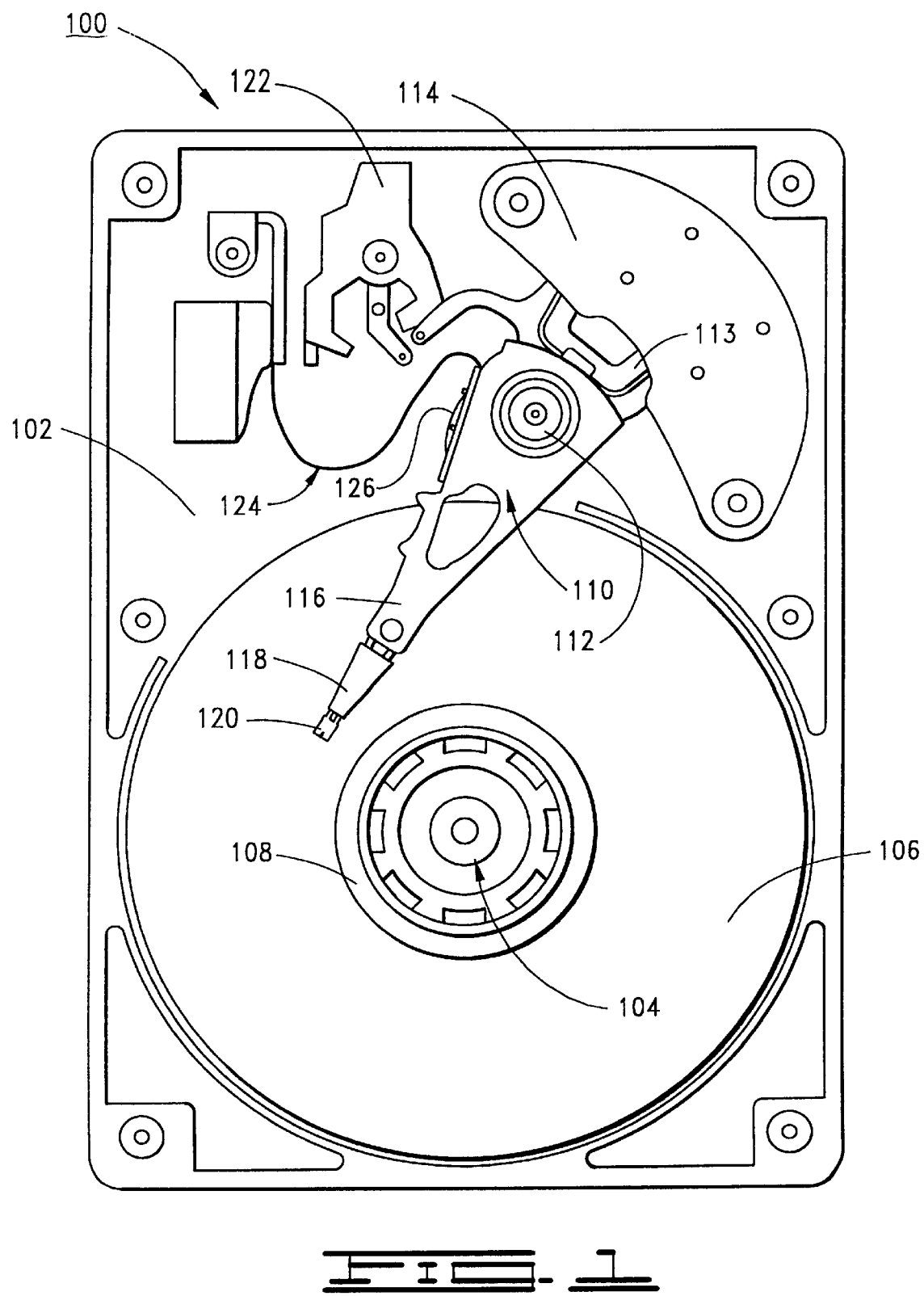
FIG. 1 shows a top plan view of a disc drive constructed in accordance with a preferred embodiment of the present invention.

Referring now to the drawings and more particularly to FIG. 1, shown therein is a top plan view of a disc drive 100 constructed in accordance with a preferred embodiment of the present invention. The disc drive 100 includes a head-disc assembly (HDA) 101 and a printed wiring assembly (PWA) which is mounted to the underside of the HDA, and thus not visible in FIG. 1.

A top cover, omitted from FIG. 1 to reveal interior portions of the HDA 101, mates with a base deck 102 of the HDA 101 in order to provide a clean internal environment for the HDA 101. A spindle motor (generally designated at 104) is supported by the base deck 102 and rotates a plurality of discs 106 at a constant high speed. A disc clamp 108 secures the discs 106 to the spindle motor 104.

The discs 106 include recording surfaces (not separately designated) having a plurality of tracks to which user data are written by way of a rotary actuator assembly 110. The actuator assembly 110 rotates about a cartridge bearing assembly 112 in response to the application of current to a coil (113, a portion of which is visible in FIG. 1) of a voice coil motor (VCM) 114 to provide positional control of the actuator assembly. A plurality of rigid arms 116 extend from the actuator assembly 110, each of which supports a corresponding flexible suspension assembly 118. A plurality of heads 120 are supported by the suspension assemblies 118 over the tracks of the discs 106 by an air bearing established by air currents set up by the high speed rotation of the discs 106. As will be discussed in greater detail below, each head 120 is preferably characterized as a high performance magneto-resistive (MR) head with an MR read element and a thin-film inductive write head.

As typical in the art, each MR read element comprises an alloy formed from materials such as cobalt, nickel and iron and possesses an electrical resistance that varies when subjected to a magnetic field of a selected orientation. Thus, the selective magnetization of the corresponding disc 106 can be detected during a read operation through the application of a bias current of selected magnitude and the detection of changes in voltage across the read element. Each write element has a conventional coil and write gap arrangement, as will be familiar to those skilled in the art. Data are accordingly written through the application of pulsed write currents of selected magnitude and duration to the coil to establish varying magnetic fields across the write gap in order to selectively magnetize the surface of the disc 106.

Finally, FIG. 1 shows a latch assembly 122 which secures the actuator assembly 110 when the disc drive 100 is deactivated and a flex circuit assembly 124 which allows communication between the actuator assembly 110 and the disc drive PWA, both in a conventional manner. The flex circuit assembly includes a preamplifier driver circuit 126 (hereinafter "preamp") mounted to the side of the actuator assembly 110 which applies the read and write currents to the heads 120 by way of head wires (not shown in FIG. 1) routed along the actuator assembly 110.

Figure 2:
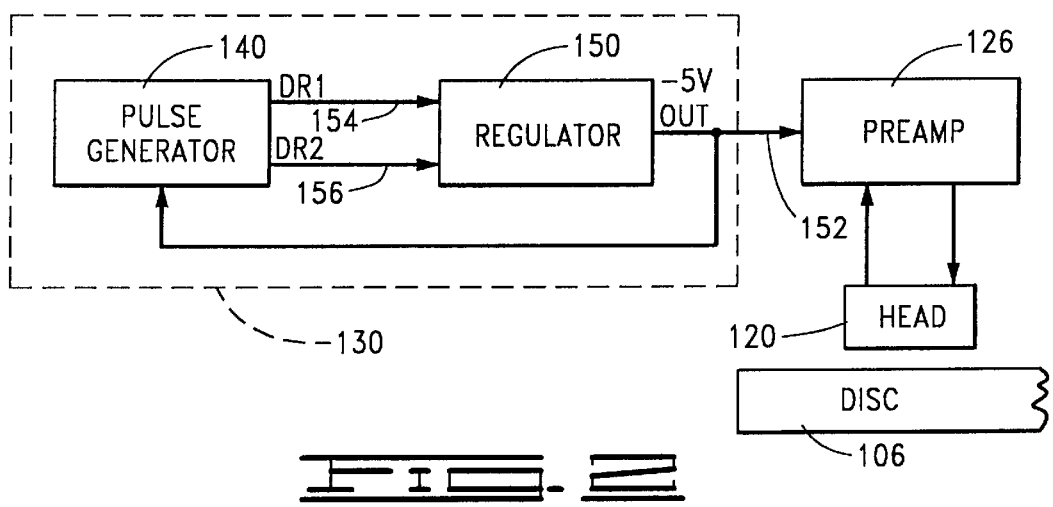
FIG. 2 is a functional block diagram of a negative voltage supply which supplies a low ripple −5V output to a preamp circuit of the disc drive of FIG. 1, the negative voltage supply comprising a pulse generator circuit and a regulator circuit.

FIG. 2 shows a functional block diagram of relevant portions of the disc drive 100, including a negative voltage supply 130 constructed in accordance with a preferred embodiment of the present invention. As shown in FIG. 2, the negative voltage supply 130 in turn comprises a pulse generator circuit 140 and a regulator circuit 150. From FIG. 2 it can be seen that the regulator circuit 150 outputs a negative voltage of −5V along signal path 152 to the preamp 126. This −5V output is generated in response to analog driver signals denoted as DR1 and DR2 which are provided to the regulator circuit 150 by the pulse generator circuit 140 on paths 154 and 156.

Figure 3:
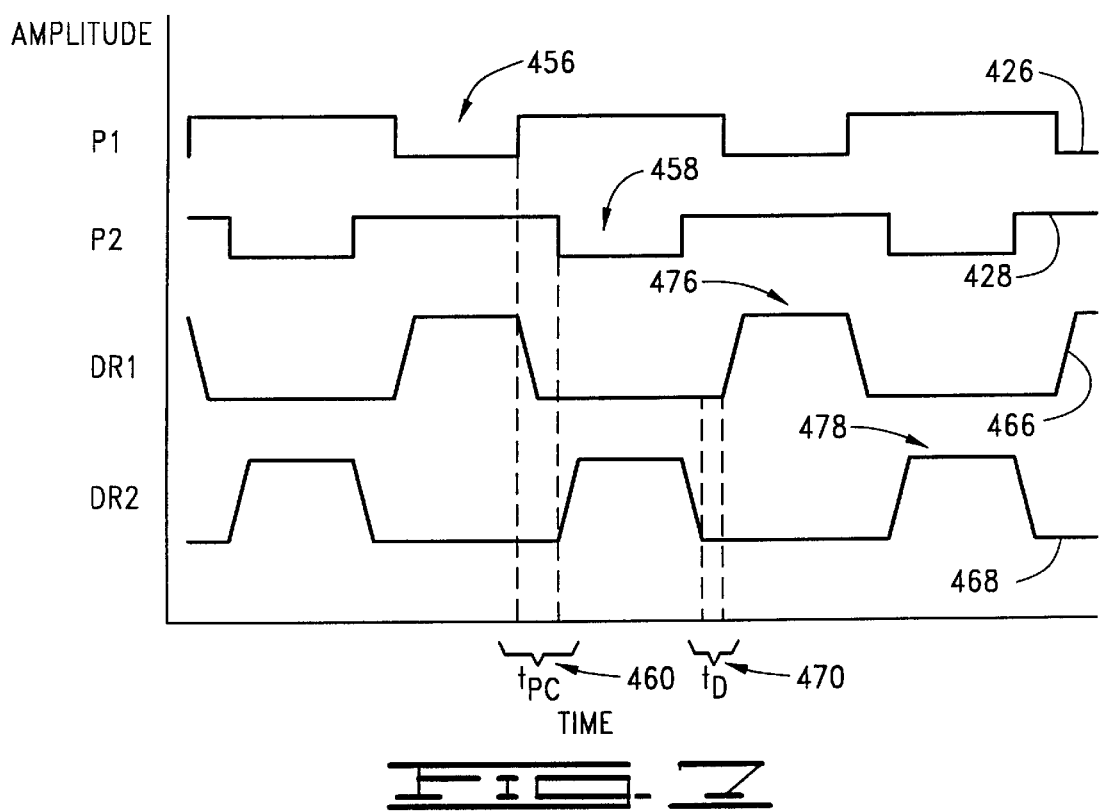
FIGS. 3 and 4 combine to provide a schematic diagram representation of the pulse generator circuit of FIG. 2 in accordance with a preferred embodiment.
Figure 4:
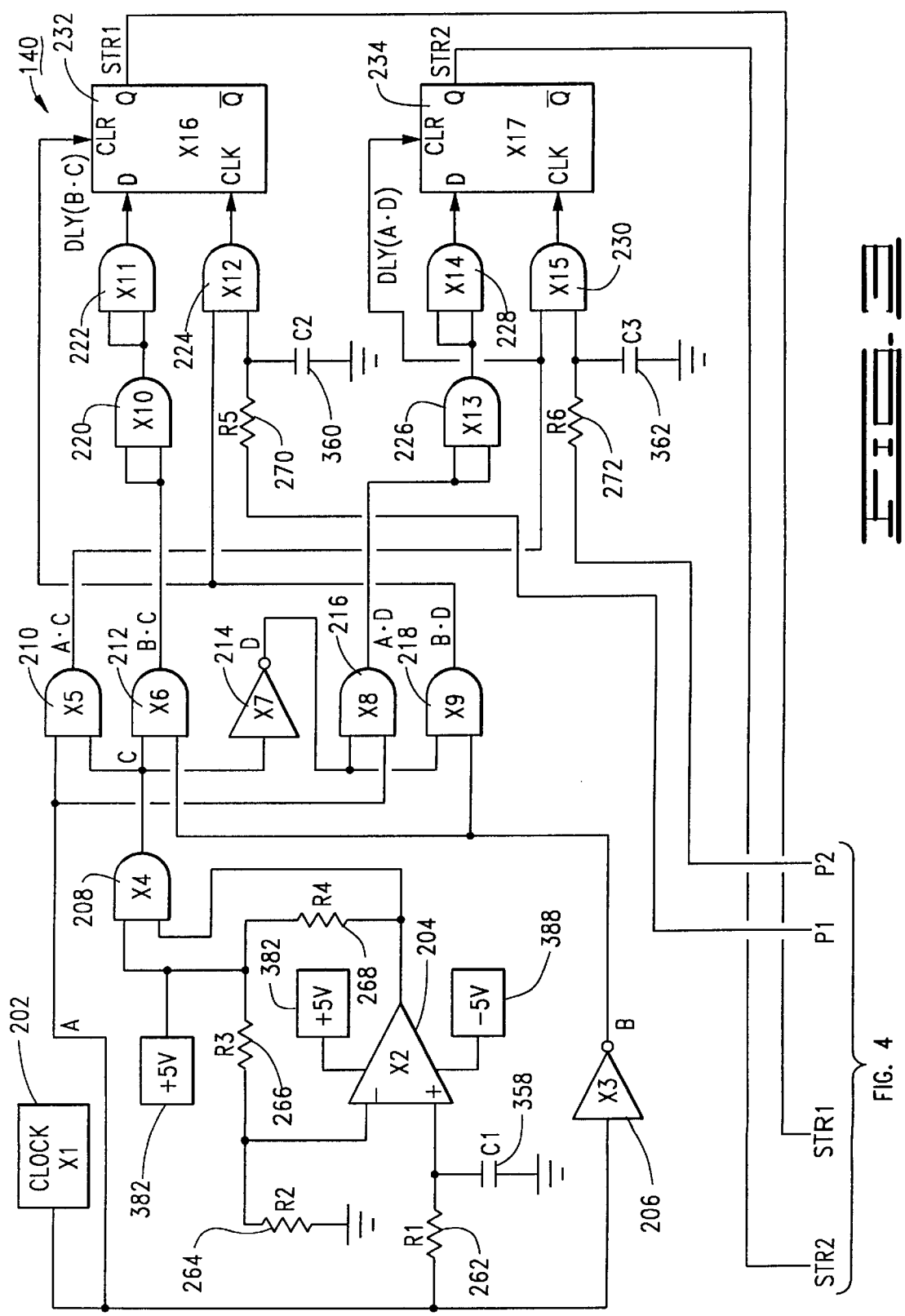
Figure 3:
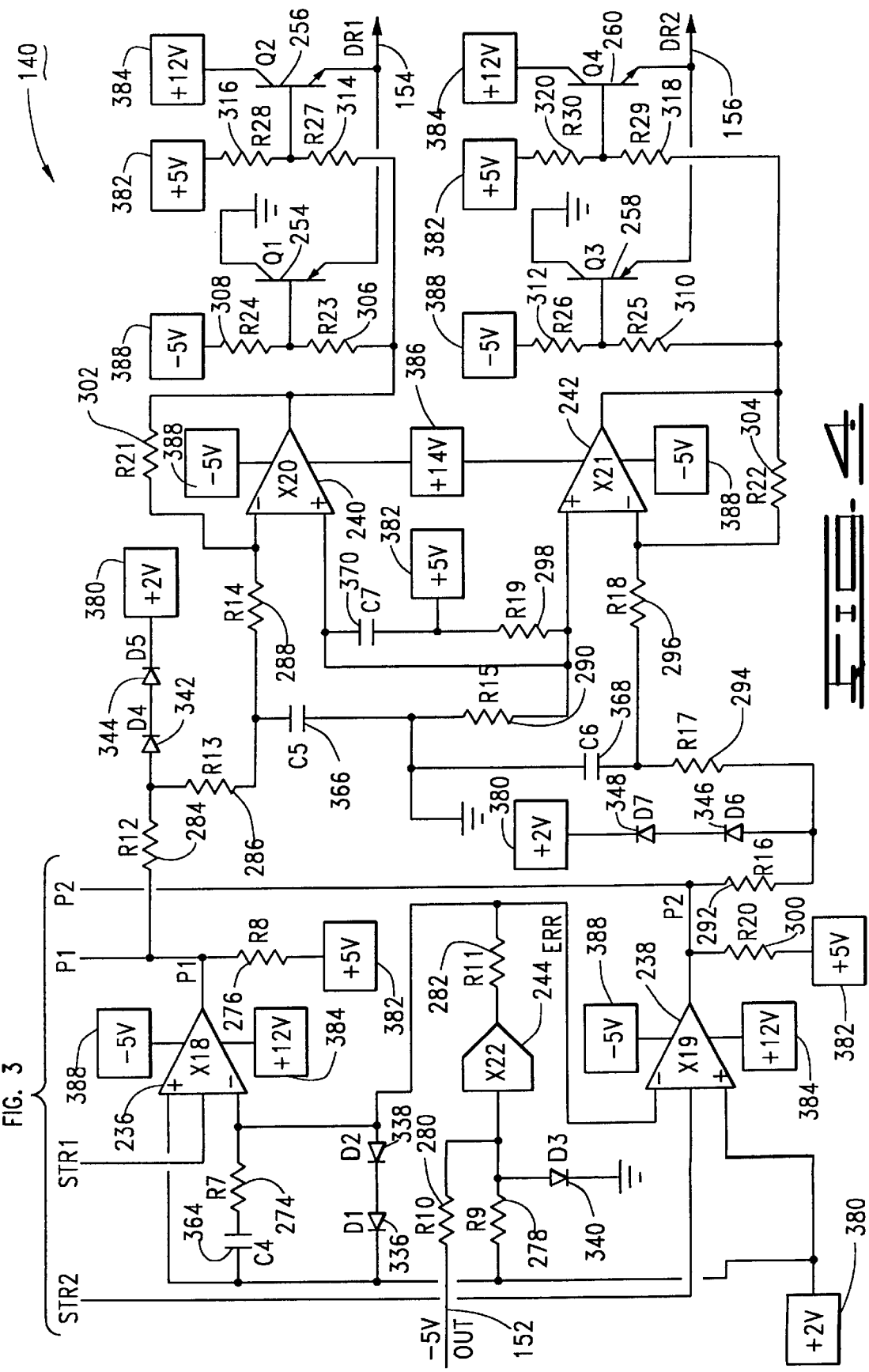
Figure 5:
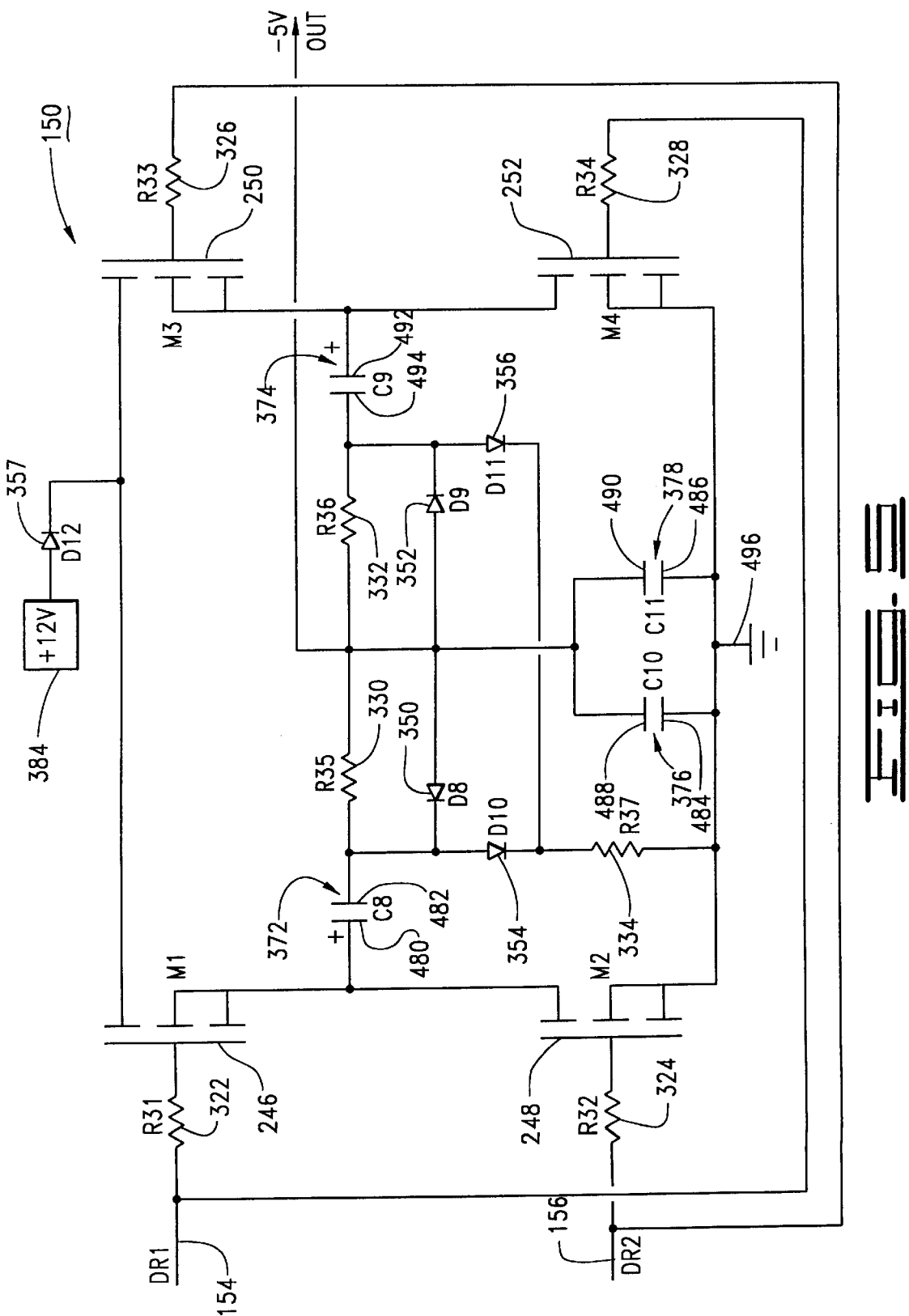
FIG. 5 provides a schematic diagram representation of the regulator circuit of FIG. 2.

To discuss preferred constructions of the pulse generator circuit 140 and the regulator circuit 150, FIGS. 3 through 5 have been provided which illustrate detailed schematic diagrams for each of these circuits. It should be noted that one of the important advantages of the invention as embodied herein is that the pulse generator circuit 140 can be readily incorporated as a portion of an existing application specific integrated circuit (ASIC) of the disc drive 100, requiring only three additional connection pins to accommodate the output driver signals DR1 and DR2 and the -5V output which is fedback from the regulator circuit 150. To facilitate the following discussion, Table 1 provides a preferred listing of various components shown in FIGS. 3 through 5, along with identification of the corresponding reference designations and equivalent part types. It will be recognized that these components do not serve as a limitation upon the scope of the claimed invention, but rather, have been provided in the spirit of providing a full disclosure of a preferred embodiment of the invention.

TABLE 1

| Reference Designation | ID | Description | Rating/Part Type |
|---|---|---|---|
| 202 | X1 | Clock Oscillator | 415 kilohertz (kHz) |
| 204 | X2 | Comparator | LM306 |
| 206 | X3 | Inverter | 74F04 |
| 208 | X4 | AND2 | 7408 |
| 210 | X5 | AND2 | 74F08 |
| 212 | X6 | AND2 | 74F08 |
| 214 | X7 | Inverter | 74F04 |
| 216 | X8 | AND2 | 7408 |
| 218 | X9 | AND2 | 74F08 |
| 220 | X10 | AND2 | 7408 |
| 222 | X11 | AND2 | 74F08 |
| 224 | X12 | AND2 | 74F08 |
| 226 | X13 | AND2 | 7408 |
| 228 | X14 | AND2 | 7408 |
| 230 | X15 | AND2 | 74F08 |
| 232 | X16 | DFLOP | 74F74 |
| 234 | X17 | DFLOP | 74F74 |
| 236 | X18 | Comparator | LM306 |
| 238 | X19 | Comparator | LM306 |
| 240 | X20 | Operational Amp | MC34083B |
| 242 | X21 | Operational Amp | MC34083B |
| 244 | X22 | Amplifier | MC34083B(gain 8.84) |
| 246 | M1 | MOSFET | MTDF1N03HD |
| 248 | M2 | MOSFET | MMBF0201N |
| 250 | M3 | MOSFET | MTDF1N03HD |
| 252 | M4 | MOSFET | MMBF0201N |
| 254 | Q1 | PNP Transistor | QN5771 |
| 256 | Q2 | NPN Transistor | QN2369 |
| 258 | Q3 | PNP Transistor | QN5771 |
| 260 | Q4 | NPN Transistor | QN2369 |
| 262 | R1 | Resistor | 1000 ohms (Ω) |
| 264 | R2 | Resistor | 1370 Ω |
| 266 | R3 | Resistor | 1500 Ω |
| 268 | R4 | Resistor | 392 Ω |
| 270 | R5 | Resistor | 750 Ω |
| 272 | R6 | Resistor | 750 Ω |
| 274 | R7 | Resistor | 1820 Ω |
| 276 | R8 | Resistor | 750 Ω |
| 278 | R9 | Resistor | 28.0 Ω |
| 280 | R10 | Resistor | 82.5 kΩ |
| 282 | R11 | Resistor | 9090 Ω |
| 284 | R12 | Resistor | 51.1 Ω |
| 286 | R13 | Resistor | 1180 Ω |
| 288 | R14 | Resistor | 1150 Ω |
| 290 | R15 | Resistor | 1330 Ω |
| 292 | R16 | Resistor | 51.1 Ω |
| 294 | R17 | Resistor | 1180 Ω |
| 296 | R18 | Resistor | 1150 Ω |
| 298 | R19 | Resistor | 1130 Ω |
| 300 | R20 | Resistor | 750 Ω |
| 302 | R21 | Resistor | 8450 Ω |
| 304 | R22 | Resistor | 8450 Ω |
| 306 | R23 | Resistor | 255 Ω |
| 308 | R24 | Resistor | 1580 Ω |
| 310 | R25 | Resistor | 255 Ω |
| 312 | R26 | Resistor | 1580 Ω |
| 314 | R27 | Resistor | 255 Ω |
| 316 | R28 | Resistor | 1580 Ω |
| 318 | R29 | Resistor | 255 Ω |
| 320 | R30 | Resistor | 1580 Ω |
| 322 | R31 | Resistor | 56.2 Ω |
| 324 | R32 | Resistor | 237 Ω |
| 326 | R33 | Resistor | 56.2 Ω |
| 328 | R34 | Resistor | 237 Ω |
| 330 | R35 | Resistor | 287 Ω |
| 332 | R36 | Resistor | 287 Ω |
| 334 | R37 | Resistor | 0.5 Ω |
| 336 | D1 | Diode | 1N4454 |
| 338 | D2 | Diode | 1N4454 |
| 340 | D3 | Diode | 1N4454 |
| 342 | D4 | Diode | 1N4454 |

TABLE 1-continued

| Reference Designation | ID | Description | Rating/Part Type |
|---|---|---|---|
| 344 | D5 | Diode | 1N4454 |
| 346 | D6 | Diode | 1N4454 |
| 348 | D7 | Diode | 1N4454 |
| 350 | D8 | Diode | MBR0520L |
| 352 | D9 | Diode | MBR0520L |
| 354 | D10 | Diode | MURS120T |
| 356 | D11 | Diode | MURS120T |
| 357 | D12 | Diode | DN5821 |
| 358 | C1 | Capacitor | 680 picofarads (pF) |
| 360 | C2 | Capacitor | 120 pF |
| 362 | C3 | Capacitor | 120 pF |
| 364 | C4 | Capacitor | 6.8 pF |
| 366 | C5 | Capacitor | 220 pF |
| 368 | C6 | Capacitor | 220 pF |
| 370 | C7 | Capacitor | 0.01 microfarads ($\mu$F) |
| 372 | C8 | Capacitor | 22 $\mu$F |
| 374 | C9 | Capacitor | 22 $\mu$F |
| 376 | C10 | Capacitor | 4.7 $\mu$F |
| 378 | C11 | Capacitor | 10 $\mu$F |
| 380 | +2 V | Voltage Source | Externally generated |
| 382 | +5 V | Voltage Source | Externally generated |
| 384 | +12 V | Voltage Source | Externally generated |
| 386 | +14 V | Voltage Source | Externally generated |
| 388 | −5 V | Voltage Source | Externally generated |

For clarity, it will be noted that the −5V voltage source 388 listed in Table 1 is to be distinguished from the low ripple −5V output of the negative voltage supply 130 of FIG. 2. It will be further noted that although externally generated voltages of −5V, +2V, +5V, +12V and +14V have been shown in Table 1, such are merely in accordance with a preferred embodiment and it will be clear to those skilled in the art from the following review of FIGS. 3 through 5 that other configurations of externally generated voltages could be readily employed, as required.

To now begin a detailed discussion of the pulse generator circuit 130, an overall schematic diagram of which appears in FIGS. 3 and 4, the X1 clock oscillator 202 (shown in FIG. 3) outputs a squarewave signal at a selected frequency of about 415 kilohertz (kHz), as indicated by Table 1. This output is denoted as signal A and graphically set forth at 402 in FIG. 6, which shows a number of signals generated by the pulse generator 140, with the signal representations of FIG. 6 aligned along a common vertical reference axis 403.

The X1 clock oscillator 202 preferably comprises a crystal oscillator which outputs the requisite squarewave signal frequency, but can also be embodied using divider circuitry that applies appropriate frequency division to an existing higher frequency clock signal utilized elsewhere by the disc drive 100.

The signal A is inverted by X3 inverter 206 to obtain a complementary signal B, as shown at 404 in FIG. 6. The signal A is further provided to a delay network comprising an RC filter (formed from the R1 resistor 262 and C1 capacitor 358), the X2 comparator 204, and X4 AND2 208 ("AND gate"). The resulting output from the X4 AND gate 208 is a signal denoted as C (shown at 406 in FIG. 6) which is delayed slightly with respect to signal A. The signal C is further inverted by the X7 inverter 214 to generate a complementary delayed signal D, shown at 408 in FIG. 6.

The manner in which the complimentary A and B signals and the corresponding complimentary, delayed C and D signals are used to generate the DR1, DR2 driver signals (on paths 154, 156 of FIG. 2) will be discussed in detail below. However, at this point it will be noted that the various amounts of delay represented in FIG. 6 have been exaggerated, so that in practice the actual delay of signals C and D will be less than that shown in FIG. 6. Stated another way, reference time intervals 1 through 12 (shown along horizontal reference time axis 407) are non-uniformly spaced with respect to elapsed time; for example, the interval from 1 to 3 along axis 407 is preferably about 1.2 microseconds (usec), whereas the time interval from 1 to 2 along axis 407 is preferably about 40 nanoseconds (nsec). This non-uniform spacing is likewise contemplated for the remaining reference time intervals of FIG. 6 and has been provided to more clearly illustrate the operational advantages of the pulse generator circuit 140 of FIGS. 3 and 4.

Continuing with FIG. 3, the A, B, C, and D clock signals are logically combined by X5, X6, X8 and X9 AND gates 210, 212, 216 and 218, respectively, to generate combined signals A•C, B•C, A•D and B•D which are represented graphically at 410, 412, 414 and 416 in FIG. 6. The B•C signal is further delayed by a small amount due to the purposefully selected propagation delays associated with X10 and X11 AND gates 220, 222 in order to generate a delayed B•C signal denoted as DLY(B•C) at 418 in FIG. 6. The amount of this delay is controlled through the selection of X10 and X11 AND gates (see Table 1), which will be recognized as having response times that are relatively slower than the faster 74F08 AND gates used elsewhere in FIG. 3, such as the X12 AND gate 224. Of course, should the circuit of FIG. 3 be incorporated into a common integrated circuit, the X10 and X11 AND gates 220, 222 will be preferably designed to provide similar performance characteristics as the equivalent discrete 74F08 devices listed in Table 1.

The DLY(B•C) signal is provided as a D-input to the X16 DFLOP 232, which outputs, at output Q, the input logic level at input D at each selected transition at a clock input CLK, in accordance with known DFLOP operation. The X16 DFLOP 232 further receives a clear input CLR comprising the signal B•D (416 in FIG. 6). Although not explicitly set forth in FIG. 3 for simplicity, it will be noted that the X16 DFLOP 232 and the X17 DFLOP 234 each have a high preset input, so that a high clear input will set each output high. The significance of this particular operational configuration will be made apparent below.

The clock input (CLK) of the X16 DFLOP 232 receives the output of the X12 AND gate 224, which logically combines the B•D signal 416 with a pulse control signal P1 (426 in FIG. 6), the generation of which will be discussed below. The pulse signal P1 is further delayed by an RC network comprising the R5 resistor 270 and the C2 capacitor 360, connected as shown.

In a similar fashion, the A•D signal is delayed by a small amount due to the propagation delays associated with the X13 and X14 AND gates 226, 228, thereby generating a delayed A•D signal denoted as DLY(A•D) at 420 in FIG. 6. The DLY(A•D) signal 420 is provided as a D-input to the X17 DFLOP 234, which further receives the ARC signal 410 as a clear input CLR and the output of X15 AND gate 230 as a clock input CLK. This clock input is obtained through the logical combination of the A•C signal 410 and a second pulse control signal P2 (428 in FIG. 6).

The outputs of the X16 and X17 DFLOPs 232, 234, denoted STR1 and STR2 and shown at 422 and 424 in FIG. 6, are provided as strobe inputs to the X18 and X19 comparators 236, 238 (shown in FIG. 4). As will be recognized, the X18, X19 comparators 236, 238 each operate in a normal fashion when the associated strobe input is at a high level (such as +5V) so that a differential output is provided in relation to the voltages at the respective positive and negative input terminals. That is, during normal operation, each of the X18, X19 comparators 236, 238 outputs a high signal (such as +5V) when the voltage at the respective positive (+) input terminals exceeds the voltage at the respective negative (−) input terminals, and conversely outputs a low signal (such as 0V) when this situation is reversed. However, when the strobe input is low, each of the comparators provides a high output regardless of the voltages provided at the differential input terminals.

The positive (+) input terminals of the X18 and X19 comparators 236, 238 are tied to the +2V reference voltage source 380 and the negative (−) input terminals receive an error signal ERR generated in response to the −5V output signal of the regulator circuit 150 (see FIG. 2). The error signal ERR is represented at 430 in FIG. 6. It will be recognized, though, that the actual amplitude excursions of the ERR signal 430 will be on the order of a few hundred millivolts, so that the amplitude of the signal in FIG. 6 has been exaggerated for clarity.

Finally, the P1, P2 pulse control signals (426, 428 of FIG. 6) output by the X18 and X19 comparators 236, 238 are fed back to the X16 and X17 DFLOPS 232, 234 to form respective clock inputs to these devices as shown, in combination with the ARC and BUD signals, respectively. The P1 and P2 pulse control signals 426, 428 are of selected length in relation to the load of the negative voltage supply 130 (FIG. 2), and are generated as follows. It will be understood that a moderate load is contemplated for the representations of FIG. 6; operation of the negative voltage supply 130 at substantially full load will be discussed later.

To explain the operation of the X16, X17 DFLOPs 232, 234 under the contemplated moderate load, with reference first to the X16 DFLOP 232, each rising edge of the BUD signal 416 (one such rising edge being identified at 432 in FIG. 6) will clear the X16 DFLOP 232, setting the output thereof high; hence, the rising edge 432 results in a corresponding rising edge 434 in the STR1 signal 422. Because the STR1 signal 422 goes high at this point, the X18 comparator 236 transitions from a strobed operation to normal operation and commences providing an output in relation to the differential voltages at the input terminals of the X18 comparator 236.

The P1 pulse control signal 426 will take a low value (such as 0V), as indicated by falling edge 436 in FIG. 6, as the ERR error signal 430 at this point is greater than the +2V reference input (from source 380) provided to the positive input terminal of the X18 comparator 236. As shown in FIG. 6, the ERR error signal 430 will decrease until it reaches the +2V threshold value (as indicated at point 438), causing a rising edge 440 in the P1 pulse control signal.

Similarly, with regard to the X17 DFLOP 234, a rising edge 442 in the ARC signal 410 results in a corresponding rising edge 444 in the STR2 signal. In response, the X19 comparator 238 initiates normal differential operation and provides a falling edge 446 in the P2 pulse control signal 428. The P2 pulse control signal remains low until the ERR signal 430 falls to the +2 reference voltage (indicated at point 448), at which point a rising edge 450 is provided in the P2 pulse control signal 428, as shown.

Thus, during moderate load conditions the falling edges 436, 446 of the P1, P2 pulse control signals 426, 428 are timed by the respective rising edges 432, 442 of the B•D signal 416 and the A•C signal 410, and the subsequent rising edges 440, 450 of the P1, P2 pulse control signals 426, 428 are timed by the ERR error signal 430. In this manner, the lengths of each of the pulses (generally indicated at 452, 454 respectively) of the P1, P2 pulse control signals 426, 428 vary in relation to the load served by the negative voltage supply 130.

During a substantially full load condition, however, the P1, P2 pulse control signals 426, 428 have corresponding pulse lengths that are extended beyond the example contemplated in FIG. 6. More particularly, FIG. 7 shows another set of P1, P2 pulse control signals (which have also been designated as 426, 428 for clarity) each having pulses 456, 458 respectively, which are substantially longer than the pulses 452, 454 shown in FIG. 6. Nevertheless, it will be noted that even under substantially full load, the P1, P2 pulses 456, 458 do not overlap; that is, there is a minimum pulse control delay $t_{PC}$ (indicated by interval 460) between each pair of successive pulses. This delay $t_{PC}$ is guaranteed by the operation of the X16, X17 DFLOPs 232, 234, in that the respective clear signals A•C and B•D 410, 416 cyclically transition low, forcing the respective STR1, STR2 strobe signals 422, 424, and hence the P1, P2 pulse control signals 426, 428, to change state. This guaranteed minimum delay $t_{PC}$ ensures proper, balanced operation of the regulator circuit 150, as discussed below.

Referring again to FIG. 4, the P1 and P2 pulse control signals are provided to a driver network formed from the X20, X21 operational amplifiers 240, 242, the Q1 through Q4 transistors 254, 256, 258 and 260 and the associated discrete components. This driver network operates to generate the aforementioned driver signals DR1 and DR2, which are output on paths 154, 156 in FIG. 2 and represented graphically at 462, 464 in FIG. 6, and at 466, 468 in FIG. 7. As can be seen from a review of FIGS. 5 and 6, the DR1, DR2 driver signals have associated pulses (such as indicated at 472, 474, 476, 478 respectively) that are generated in response to the corresponding P1 and P2 pulse control signals 462, 464, 466, 468. More particularly, the transitions of the pulses 472, 474, 476, 478 are initiated in response to corresponding transitions in the pulses 462, 464, 466, 468. Hence, at a substantially maximum load condition, there will exist a corresponding, minimum delay $t_D$ (indicated at 470 in FIG. 7) between successive, alternatively occurring pulses 476, 478 in the DR1, DR2 driver signals 466, 468, so that the pulses 476, 478 are mutually exclusive in time.

The manner in which the driver signals DR1 and DR2 control the −5V output of the regulator circuit 150 will now be discussed with reference to FIG. 5, which sets forth the regulator circuit 150 in greater detail. As shown in FIG. 5, the DR1 signal is provided to both the M1 and M4 MOSFETs 246, 252 and the DR2 signal is provided to both the M2 and M3 MOSFETs 248, 250, which facilitates the alternate charging and discharging of the C8, C9 storage capacitors 372, 374.

More particularly, at such time that the DR1 driver signal 462 is high (such as shown at pulse 472 in FIG. 7), a path is established from the +12V voltage source 384 to the D12 diode 357, the M1 MOSFET 246, the C8 capacitor 372, the D10 diode 354, the R37 resistor 334, and to ground 496 which is connected to the +12V voltage source 384. In this manner, charge is accumulated on a first plate 480 of the C8 capacitor 372 in relation to the duration of the DR1 driver signal pulse 472. It will be noted that a second plate 482 of the C8 capacitor 372 is operably coupled (through the R35 resistor 330) to the −5V output signal path 152.

When the pulse 474 of the DR2 driver signal 464 of FIG. 6 is subsequently applied to the M2 MOSFET 248, a path is established from the C8 capacitor 372 to the M2 MOSFET 252, the electrical ground 496, the C10 and C11 capacitors 376, 378, and the R35 resistor 330 and the D8 diode 350 back to the C8 capacitor 372. From FIG. 5 it will be noted that the R35 resistor 330 and the D8 diode 350 are connected in parallel, so that relatively more current will pass through the D8 diode 350 than through the R35 resistor 330.

As a result of this path established by the DR2 signal, the charge accumulated on the first plate 480 of the C8 capacitor 372 will be transferred to first plates 484, 486 of the C10, C11 output capacitors 376, 378, establishing the −5V voltage applied to the output path 152 using second plates 488, 490 of the C10, C11 output capacitors 376, 378. The preferred use of the two capacitors C10, C11 provides a total capacitance of around 14.7 microfarads, while maintaining an adequately low internal resistance for this capacitor pair. Accordingly, a single capacitor could be utilized so long as it possesses suitable capacitance and internal resistance ratings.

Continuing with FIG. 5, it will be recognized that the C9 storage capacitor 374 has a first plate 492 which is similarly charged during the pulse 474 of the DR2 driver signal 464, with a second plate 494 of the C9 capacitor 374 operably coupled to the −5V OUT signal path 152 through the R36 resistor 332. That is, the pulse 474 of the DR2 driver signal 464 will establish a path from the +12V voltage source 384 to the D12 diode 357, the M3 MOSFET 250, the C9 capacitor 374, the D11 diode 356, the R37 resistor 334 and to ground 496 which is operably coupled to the +12V voltage source 384. In this manner, charge will be accumulated on the first plate 492 of the C9 storage capacitor 374 in relation to the duration of the pulse 474 of the DR2 driver signal 464.

During a subsequent pulse 472 of the DR1 driver signal 462, another path is established from the C9 storage capacitor 374 to the M4 MOSFET 252, the electrical ground 496, the C10, C11 output capacitors 376, 378, and the R36 resistor 332 and the D9 diode 352 back to the C9 storage capacitor. As before, the R36 resistor 332 and the D9 diode 352 are connected in parallel so that more current will pass through the D9 diode 352 as compared to the R36 resistor 332. Thus, the accumulated charge on the first plate 492 of the C9 storage capacitor 374 is subsequently transferred to the first plates 484, 486 of the C10, C11 output capacitors 376, 378 during the pulse 472 of the DR1 driver signal 462. Accordingly, the C8, C9 storage capacitors operate in tandem, with one capacitor accumulating charge and the other capacitor transferring accumulated charge to the C10, C11 output capacitors 376, 378 during subsequent pulses of the DR1 and DR2 driver signals.

It will now be appreciated that the minimum delay t between subsequent transitions of the pulses of the respective DR1 and DR2 driver signals (as shown in FIG. 7) ensures that these pulses will remain mutually exclusive in time (i.e., will not overlap), preventing a flow-through of current from the +12V source of FIG. 5 straight to the ground terminal 496. Moreover, the forced balancing of the accumulated and transferred charge from the C8, C9 storage capacitors 372, 374 to the C10, C11 output capacitors 376, 378 ensures that the load is equally shared between the C8, C9 capacitors 372, 374, preventing one of the C8 or C9 capacitors 372, 374 from doing most of the work, such as during a low load condition. This further improves the low ripple characteristics of the negative voltage supply 130 compared to other supplies of the prior art.

The peak to peak ripple characteristics of the negative voltage supply 130 are particularly suited to the disc drive environment presented herein. By way of illustration, Table 2 below provides maximum peak to peak ripple for various disc drive operational loads:

TABLE 2

| Load | Ripple (peak—peak) | Operation |
| --- | --- | --- |
| 158 milliamps (mA) | ±50 millivolts (mV) | Write |
| 66.5 mA | ±20 mV | Read |
| 16 mA | ±75 mV | Standby |

From Table 2 it can be observed that at a peak load of 158 mA, which is encountered during a typical write operation wherein write currents are selectively applied by the preamp 126 to the head 120 (FIG. 2), the maximum peak to peak ripple is only around +50 mV. During a read operation wherein the preamp 126 applies a read bias current to the head 120 (FIG. 2), the load current is 66.5 mA with associated peak to peak ripple of +20 mV. Such low ripple performance by the negative voltage supply 130 is particularly desirable during these operations, as voltage fluctuations can adversely affect the data transfer characteristics of the disc drive 100.

Not only is the negative voltage supply 130 capable of providing low ripple performance, but it further provides fast response times, which are critical for high speed data transfer operations in high performance disc drives such as 100. Particularly, Table 3 sets forth maximum transition times (both rising and falling) as the drive transitions between various operational modes:

TABLE 3

| From | To | Max Transition Time |
| --- | --- | --- |
| 0 mA | 16 mA | 100 milliseconds (msec) |
| 16 mA | 66.5 mA | 1.0 microseconds (μsec) |
| 66.5 mA | 158 mA | 0.2 μsec |
| 158 mA | 66.5 mA | 0.5 μsec |
| 66.5 mA | 16 mA | 1.0 μsec |
| 16 mA | 0 mA | 100 msec |

It will be noted that the fast transitions between read (66.5 mA) and write (158 mA) loads are particularly important in a disc drive employing an embedded servo system, as during a write operation the disc drive 100 alternately writes user data to a selected track while intermittently reading both servo and header information from the selected track using the same head. Accordingly, the negative voltage supply 130 is particularly well suited to enable a preamp (such as 126) to transition between these respective loading conditions during operation.

In view of the foregoing, it will now be clearly understood that the present invention is directed to an apparatus and method for generating a low ripple negative voltage.

As exemplified by a preferred embodiment, a negative voltage supply (130) comprises a pulse generator circuit (140) which generates first and second driver signals (DR1 and DR2, shown at 462 and 464, 466 and 468) in relation to a load of the negative voltage supply. The first driver signal comprises a series of periodically occurring first pulses (472, 476) and the second driver signal comprises a series of periodically occurring second pulses (474, 478). The first and second pulses are mutually exclusive in time so that at least a minimum delay of selected, nonzero length (470) is provided between transitions of subsequently occurring first and second pulses.

The negative voltage supply further comprises a regulator circuit (150), operably coupled to the pulse generator circuit, which generates the negative voltage in response to the first and second driver signals utilizing a pair of storage capacitors (372, 374) which alternately accumulate and transfer charge to an output capacitor (376, 378) in response to the first and second driver signals.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for providing a negative voltage with respect to ground, comprising steps of:
    (a) generating a first driver signal comprising a series of periodically occurring, first pulses each having a length selected in relation to a magnitude of a load across which the negative voltage is applied,
    (b) generating a second driver signal comprising a series of periodically occurring second pulses each having a length selected in relation to the magnitude of the load wherein the first and second pulses are mutually exclusive and alternatingly occurring in time so that at least a minimum delay of selected nonzero length is provided between transitions of subsequently occurring first and second pulses; and
    (c) using the first and second driver signals to alternately store charge on respective first and second storage capacitors and alternately transfer the stored charge from the respective first and second storage capacitors to an output capacitor to provide the negative voltage.

2. The method of claim 1, wherein the transitions of the first and second pulses of the first and second driver signals are initiated by corresponding transitions of first and second pulse control signals.

3. The method of claim 2, wherein the first pulse control signal comprises a series of periodically occurring first control pulses, the second pulse control signal comprises a series of periodically occurring second control pulses, and the first and second control pulses are mutually exclusive and alternatingly occurring in time so that at least a minimum pulse control delay of selected, nonzero length is provided between each pair of subsequently occurring first and second control pulses.

4. The method of claim 1, wherein the using step (c) comprises steps of:
    (c1) during each of the series of first pulses accumulating charge on the first storage capacitor and transfer-ring, accumulated charge on the second storage capacitor to the output capacitor; and
    (c2) during each of the series of second pulses accumulating charge on the second storage capacitor and transferring the accumulated charge on the first storage capacitor to the output capacitor.

5. A low ripple negative voltage supply, comprising:
    a pulse generator circuit which generates first and second driver signals, the first driver signal comprising a series of periodically occurring first pulses each having a length selected in relation to a magnitude of a load connected to the negative voltage supply, the second driver signal comprising a series of periodically occurring second pulses each having a length selected in relation to the magnitude of the load, wherein the first and second pulses are mutually exclusive and alternatingly occurring in time so that at least a minimum delay of selected, nonzero length is provided between transitions of subsequently occurring first and second pulses; and
    a regulator circuit, operably coupled to the pulse generator circuit, which generates a negative voltage in response to the first and second driver signals.

6. The negative voltage supply of claim 5, wherein the pulse generator circuit uses the negative voltage to regulate the lengths of the first and second pulses.

7. The negative voltage supply of claim 5, wherein the pulse generator circuit further generates first and second pulse control signals, the first pulse control signal comprising a series of periodically occurring first control pulses, the second pulse control signal comprises a series of periodically occurring second control pulses, and the first and second control pulses are mutually exclusive and alternatingly occurring in time so that at least a minimum pulse control delay of selected, nonzero length is provided between each pair of subsequently occurring first and second control pulses.

8. The negative voltage supply of claim 7, wherein the pulse generator circuit further generates a first clock signal A at a selected frequency, a complementary second clock signal B having a phase opposite the first clock signal A, a third clock signal C comprising the first clock signal A delayed by a selected amount and a fourth clock signal D comprising the second clock signal B delayed by the selected amount, and wherein the pulse generator circuit uses the first, second, third and fourth clock signals A, B, C, D to generate the first and second pulse control signals.

9. The negative voltage supply of claim 5, wherein the regulator circuit comprises:
    a source of positive voltage;
    first and second storage capacitors operably coupled to the source of positive voltage; and
    an output capacitor operably coupled to the first and second storage capacitors, wherein during each of the series of first pulses, charge is accumulated on the first storage capacitor from the source of positive voltage and previously accumulated charge on the second storage capacitor is transferred to the output capacitor to generate the negative voltage, and wherein during each of the series of second pulses, charge is accumulated on the second storage capacitor and previously accumulated charge on the first storage capacitor is transferred to the output capacitor to generate the negative voltage.

10. The negative voltage supply of claim 9, wherein the regulator circuit further comprises:
    a first switch operably connected between the source of positive voltage and the first storage capacitor and coupled to receive the first driver signal;
    a second switch operably connected between the first storage capacitor and the output capacitor and coupled to receive the second driver signal;
    a third switch operably connected between the source of positive voltage and the second storage capacitor and coupled to receive the second driver signal; and
    a fourth switch operably connected between the second storage capacitor and the output capacitor and coupled to receive the first driver signal, wherein the first, second, third and fourth switches are made conductive in response to the application of the respective first and second driver signals.

11. A disc drive for use with a host computer, the disc drive comprising:

a rotatable disc, a read/write head controllably positionable adjacent a surface of the rotatable disc, a preamplifier/driver circuit, operably coupled to the read/write head, which applies bias currents to the read/write head to facilitate transfer of data between the disc and the host computer; and a low ripple negative voltage supply, operably coupled to the preamplifier/driver circuits which applies a low ripple negative voltage to the preamplifier/driver circuit and comprises:

- a pulse generator circuit which generates first and second driver signals the first driver signal comprising a series of periodically occurring, first pulses each having a length selected in relation to a magnitude of a load connected to the negative voltage supply, the second driver signal comprising a series of periodically occurring second pulses each having a length selected in relation to the magnitude of the load, wherein the first and second pulses are mutually exclusive and alternatingly occurring in time so that at least a minimum delay of selected, nonzero length is provided between transitions of subsequently occurring first and second pulses; and
- a regulator circuit, operably coupled to the pulse generator circuit, which generates a negative voltage in response to the first and second driver signals.

12. The disc drive of claim 11, wherein the pulse generator circuit uses the negative voltage to regulate the lengths of the first and second pulses.

13. The disc drive of claim 11, wherein the pulse generator circuit further generates first and second pulse control signals, the first pulse control signal comprising a series of periodically occurring first control pulses, the second pulse control signal comprises a series of periodically occurring second control pulses, and the first and second control pulses are mutually exclusive and alternatingly occurring in time so that at least a minimum pulse control delay of selected, nonzero length is provided between each pair of subsequently occurring first and second control pulses.

14. The disc drive of claim 13, wherein the pulse generator circuit further generates a first clock signal A at a selected frequency, a complementary second clock signal B having a phase opposite the first clock signal A, a third clock signal C comprising the first clock signal A delayed by a selected amount and a fourth clock signal D comprising the second clock signal B delayed by the selected amount, and wherein the pulse generator circuit uses the first, second, third and fourth clock signals A, B, C, D to generate the first and second pulse control signals.

15. The disc drive of claim 11, wherein the regulator circuit comprises:

- a source of positive voltage;
- first and second storage capacitors operably coupled to the source of positive voltage; and
- an output capacitor operably coupled to the first and second storage capacitors, wherein during each of the series of first pulses, charge is accumulated on the first storage capacitor from the source of positive voltage and previously accumulated charge on the second storage capacitor is transferred to the output capacitor to generate the negative voltage, and wherein during each of the series of second pulses, charge is accumulated on the second storage capacitor and previously accumulated charge on the first storage capacitor is transferred to the output capacitor to generate the negative voltage.

16. The disc drive of claim 15, wherein the regulator circuit further comprises:

- a first switch operably connected between the source of positive voltage and the first storage capacitor and coupled to receive the first driver signal;
- a second switch operably connected between the first storage capacitor and the output capacitor and coupled to receive the second driver signal;
- a third switch operably connected between the source of positive voltage and the second storage capacitor and coupled to receive the second driver signal; and
- a fourth switch operably connected between the second storage capacitor and the output capacitor and coupled to receive the first driver signal, wherein the first, second, third and fourth switches are made conductive in response to the application of the respective first and second driver signals.

* * * * *